US009363307B2

(12) United States Patent
Chen

(10) Patent No.: US 9,363,307 B2
(45) Date of Patent: Jun. 7, 2016

(54) METHOD OF LINKING TO AND MONITORING MACHINING DEVICES THROUGH A CLOUD SERVICE

(71) Applicant: PRECISION MACHINERY RESEARCH & DEVELOPMENT CENTER, Taichung (TW)

(72) Inventor: Sheng-Jhe Chen, Changhua County (TW)

(73) Assignee: Precision Machinery Research & Development Center, Taichung (TW)

( * ) Notice: Subject to any disclaimer, the term of this patent is extended or adjusted under 35 U.S.C. 154(b) by 414 days.

(21) Appl. No.: 13/957,700

(22) Filed: Aug. 2, 2013

(65) Prior Publication Data

US 2015/0039750 A1    Feb. 5, 2015

(51) Int. Cl.
*H04L 12/26* (2006.01)
*H04L 29/08* (2006.01)
*H04W 4/00* (2009.01)
*H04L 12/24* (2006.01)

(52) U.S. Cl.
CPC ............... *H04L 67/10* (2013.01); *H04W 4/003* (2013.01); *H04L 41/5096* (2013.01)

(58) Field of Classification Search
CPC ..... G06F 9/5072; H04W 4/003; H04L 67/10; H04L 41/5096
See application file for complete search history.

(56) References Cited

U.S. PATENT DOCUMENTS

| | | | |
|---|---|---|---|
| 6,832,120 B1 * | 12/2004 | Frank | G05B 15/02 700/17 |
| 2006/0067341 A1 * | 3/2006 | Barber | H04L 12/2803 370/401 |
| 2013/0304797 A1 * | 11/2013 | Warren | G06Q 40/02 709/203 |

* cited by examiner

*Primary Examiner* — Kim T Nguyen
(74) *Attorney, Agent, or Firm* — Rosenberg, Klein & Lee

(57) ABSTRACT

A method of linking to and monitoring machining devices through the cloud service enables a user to use a cloud app on the cloud to link to machining device at a specific client through a cloud service. The cloud service has API function commands for the cloud app to call and use. The client has an integrated execution module to connect to the machining device. The integrated execution module on the client links to the cloud service through a cloud connection module.

6 Claims, 5 Drawing Sheets

METHOD OF LINKING TO AND MONITORING MACHINING DEVICES THROUGH A CLOUD SERVICE

BACKGROUND OF THE INVENTION

1. Field of Invention

The invention relates to a connection method of machining device and, in particular, to a method of linking to and monitoring machining device through the cloud service.

2. Related Art

With the development of information technology, remote monitoring and control of certain popularity nowadays have been applied to CNC machining devices. With the popularization of Internet, network transmission has become a primary feature of controllers for various brands of machining devices. One can use a computer or the equivalent to remotely monitor or control the device by using a controller with such a function.

At the present stage, however, manufacturers have production facilities at different regions in order to provide consumers immediate services and to reduce transportation or labor costs. It is then a common problem for the manufacturers to concurrently monitor in real time machining devices at different production facilities. Furthermore, factories of most manufacturers usually have a variety of different brands of machining devices, each of which has a corresponding API (Application Programming Interface). They cannot communicate with each other. This further causes great troubles in integration and control for manufacturers.

It is thus a primary objective of the invention to solve the above-mentioned problems.

SUMMARY OF THE INVENTION

An objective of the invention is to provide a method of linking to and monitoring machining devices via a cloud service and having the effect of monitoring/operating in real time machining devices located at different production facilities.

Another objective of the invention is to provide a method of linking to and monitoring machining devices via a cloud service that utilizes the advantages of cloud computing to process and analyze a huge amount of data within a short time.

A further objective of the invention is to provide a method of linking to and monitoring machining devices via a cloud service that utilizes an integrated execution module integrated with API's for machining devices of different brands to connect simultaneously to those machining devices.

To achieve the above-mentioned objectives, the disclosed method of linking to and monitoring machining devices via a cloud service enables a user to use a cloud app to connect to machining devices of a specific client via a cloud service. The cloud service includes API function commands for the cloud app to call and use. Each client has an integrated execution module for connections with machining devices. The integrated execution module of each client connects to the cloud service via a cloud connection module. The method includes the following steps. A user uses the cloud app to call and use the API function command of the cloud service. The cloud connection module connected with the cloud service also receives the API function command of the cloud service. The cloud connection module follows the API function command to obtain corresponding machining device information via the integrated execution module. The information is transmitted back to the cloud app via the cloud connection module and the cloud service.

Moreover, the cloud app and the cloud connection module of the integrated execution module of the client are linked to the cloud service via the Internet.

Besides, the cloud service has a registration table that establishes identification (ID) information of the integrated execution module of at least one client and information of users that are allowed to the link to the integrated execution module. Before the integrated execution module of the client links to the cloud service via the cloud connection module, the cloud service first uses the registration table to check whether the ID information carried by the cloud connection module has been established in the registration table. If it is already established, then the connection is granted; otherwise, the link is disallowed. Before the user uses the cloud app to link to the cloud service, the user has to first enter user information via the cloud app to the cloud service. The cloud service uses the registration table to check whether the user information has been registered. If it is already registered, then the connection is granted; otherwise, the link is disallowed.

Preferably, the ID information includes a hardware lock ID and an integrated execution module ID code. The user information includes a cloud app ID and an integrated execution module ID code. After the cloud app or the integrated execution module of the client is verified in the registration table of the cloud service, it can link to the integrated execution module or cloud app of the same integrated execution module ID code via the cloud service.

Furthermore, the cloud has a cloud database connected to the cloud service. The cloud database provides space for the cloud app, so that the cloud app can use the cloud to process and analyze a huge amount of data within a short time. The integrated execution module of each client is further connected to a host database. When a huge amount of data is extracted, they can be first saved in the host database. After the extraction is over, the data are sent to the cloud database.

The integrated execution module of each of the clients integrates multiple sets of API's for connections with machining devices of particular brands. The integrated execution module generates a command thread according to the API's required by a machining device. The command thread is used to extract required information from the corresponding machining device.

Preferably, the integrated execution module is connected with a common function runtime module. After the integrated execution module integrates the app interfaces, it further establishes a common app interface and puts it in the common function runtime module. The common function runtime module has a plug-in interface for defining the function names and data structure thereof. The developer can add it to their references and establish a naming space for calling to use.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
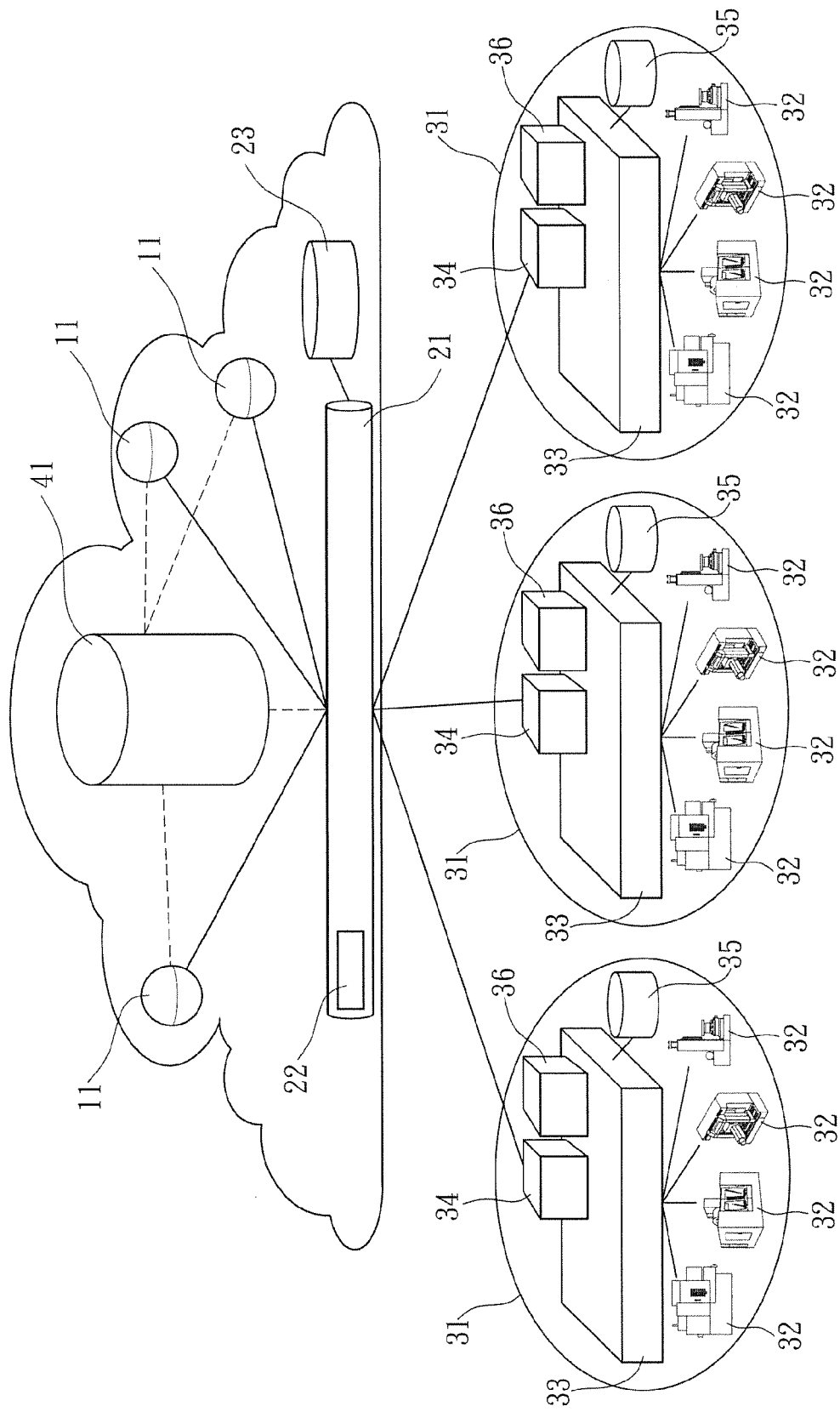
FIG. 1 is a schematic view showing the system structure of the invention.

Please refer to FIG. 1. The disclosed method of linking to and monitoring machining devices via a cloud service is implemented on a cloud service system. The cloud service system includes at least one cloud app 11, a cloud service 21, and a plurality of clients 31.

The cloud apps 11 are stored on the cloud for a user to operate thereon. The cloud service 21 links to the cloud apps 11 via the Internet. The cloud service 21 further has API function commands 22 for the cloud apps 11 to call and use. Each of the clients 31 consists of at least one machining device 32, and has an integrated execution module 33 to connect to the machining devices 32 thereof. The integrated execution module 33 of each of the clients 31 is connected to the cloud service 21 via a cloud connection module 34 and the Internet.

Besides, the cloud service 21 has a registration table 23 that establishes identification (ID) information of the integrated execution module 33 of at least one client 31 and information of users that are allowed to the link to the integrated execution module 33 of the client 31. Therefore, the cloud apps 22 and the integrated execution module 33 of the client 31 have to pass the privilege check of the registration table 23 before connecting to the cloud service 21. Preferably, the ID information includes a hardware lock ID and an integrated execution module ID code. The user information includes a cloud app ID and an integrated execution module ID code. After the cloud app 11 or the integrated execution module 33 of the client 31 is verified in the registration table 23 of the cloud service 21, it can link to the integrated execution module 33 or cloud app 11 of the same integrated execution module ID code via the cloud service 21.

Furthermore, the cloud has a cloud database 41 connected to the cloud service 21. The cloud database 41 provides the cloud app 11 with buffer space, so that the cloud app 11 can use the cloud to process and analyze a huge amount of data within a short time. Thus, the invention enjoys the advantages of cloud computing. The integrated execution module 33 of each of the clients 31 is further connected with a host database 35. When a huge amount of data is extracted, they are first saved in the host database 35. After the extraction is over, the data are transmitted again to the cloud database 41 to overcome the issue of network speed between the cloud and the client 31.

Figure 2:
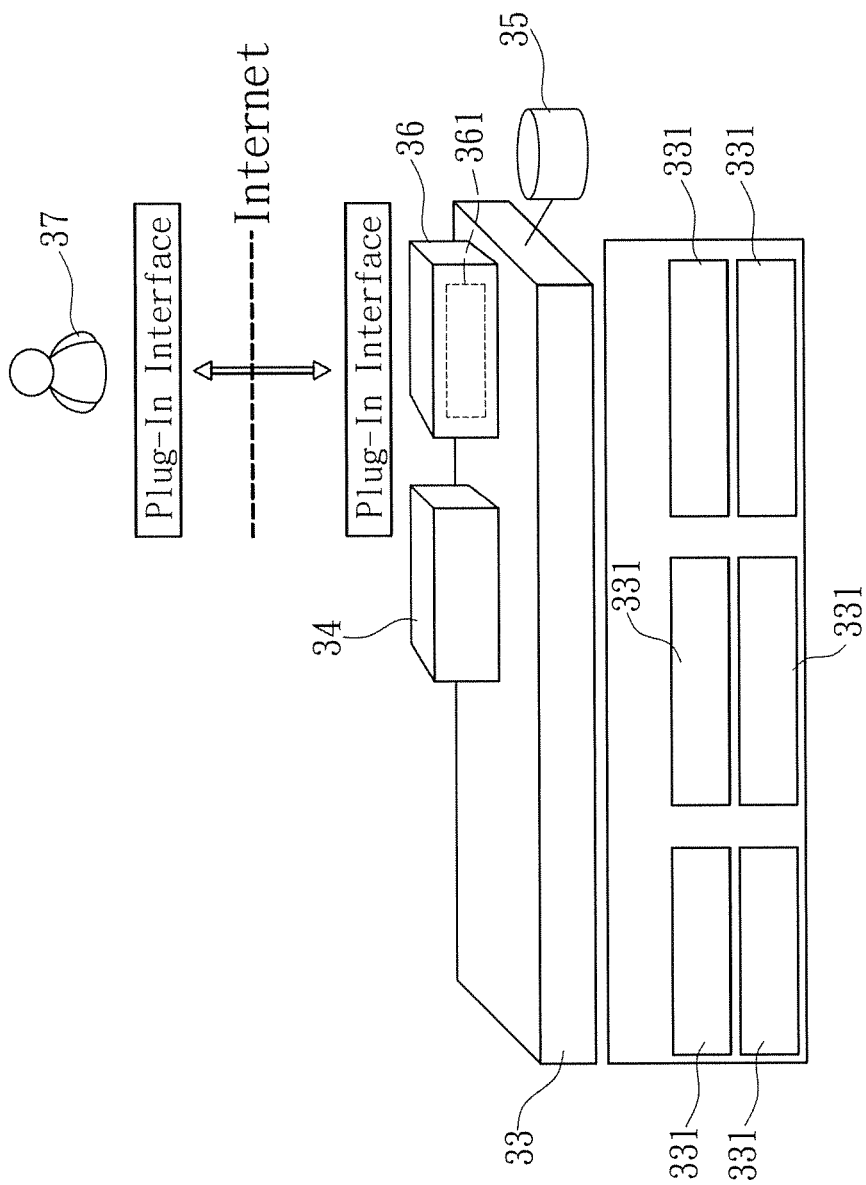
FIG. 2 is a schematic view showing the structure of the common function runtime module according to the invention.

As shown in FIG. 2, the integrated execution module 33 of each of the clients 31 integrates multiple app interfaces 31 for distinct brands of machining devices. The integrated execution module 33 generates a command thread for the app interface of each machining device 32, so as to extract necessary information from the corresponding machining device 32. The integrated execution module 33 is further connected with a common function runtime module 36. After the integrated execution module 33 integrates all of the app interfaces 31, it further establishes a common app interface 361 in the common function runtime module 36. The common function runtime module 36 has a plug-in interface for defining the function names and data structure thereof. Developers 37 can add the plug-in interface to their references and establish naming space for calling to use.

With the above-mentioned features, a developer can write or expand a micro app by himself. This is because of the common routine runtime module 36 and the plug-in interface allows the developer to use the function names and data structure defined by the plug-in interface. The developer does not need to understand the app interface for the app interface of each individual brand. This greatly reduces the amount of codes and largely facilitates the development of apps. In view of different needs, one can also build various customized apps for users.

Figure 3:
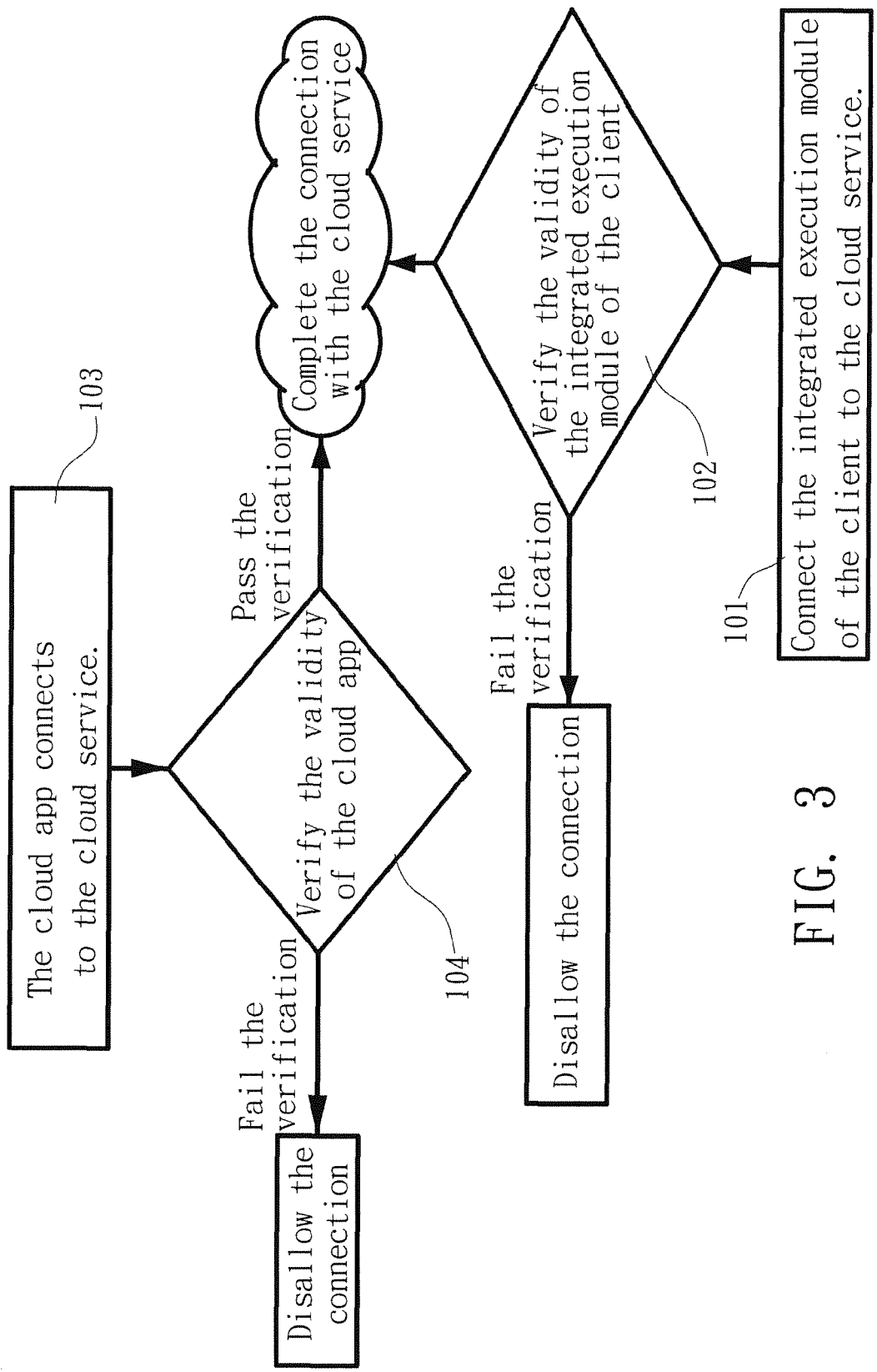
FIG. 3 is a flowchart showing the steps for the cloud app and the cloud connection module of the integrated execution module to link to the cloud service.

Please refer to FIG. 3 for the disclosed method of linking to and monitoring machining devices through a cloud service. The method involves the following steps:

Step 101: The integrated execution module 33 of a client 31 links to the cloud service 21. After the integrated execution module 33 of the client 31 is turned on, the cloud connection module 34 immediately links to the cloud service 21 via the Internet.

Step 102: Verify the validity of the integrated execution module 33 of the client 31. Before the integrated execution module 33 of the client 31 links to the cloud service 21 via the cloud connection module 34, the cloud service 21 uses the registration table 23 thereof to verify whether the ID information carried by the cloud connection module 34 (hardware lock ID and integrated execution module ID code) has been established in the registration table 23. If it has been established, then the connection is granted; otherwise, the connection is disallowed.

Step 103: The cloud app 11 connects to the cloud service 21. After a user uses the cloud app 11 to enter specific user information (cloud app ID and integrated execution module ID code), the cloud app 11 transmits the user information via the Internet to the cloud service 21.

Step 104: Verify the validity of the cloud app 11. The cloud service 21 uses the registration table 23 thereof to verify whether the user information has been established therein. If it has been established, then the connection is granted; otherwise (such as an attempt by a hacker), the connection is disallowed.

Figure 4:
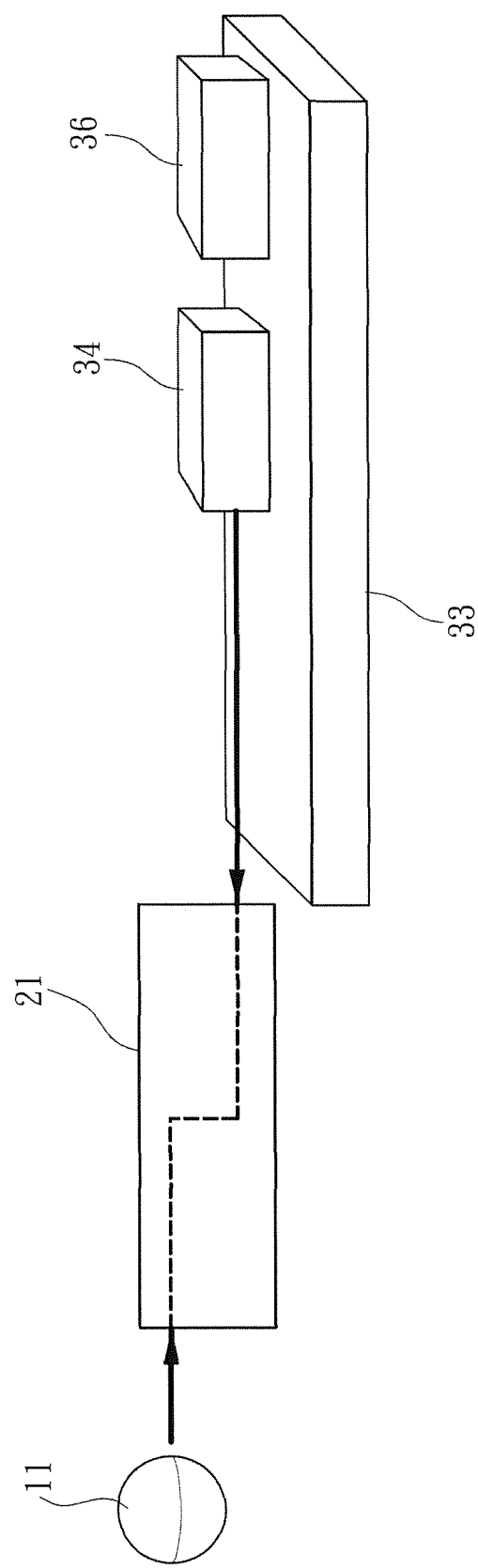
FIG. 4 is a schematic view showing the link relations among the cloud service, the cloud app, and the cloud connection module of the integrated execution module.

After the above-mentioned steps are completed, the connection relation between the cloud app 11 and the cloud connection module 34 of the integrated execution module 33 is shown in FIG. 4.

Figure 5:
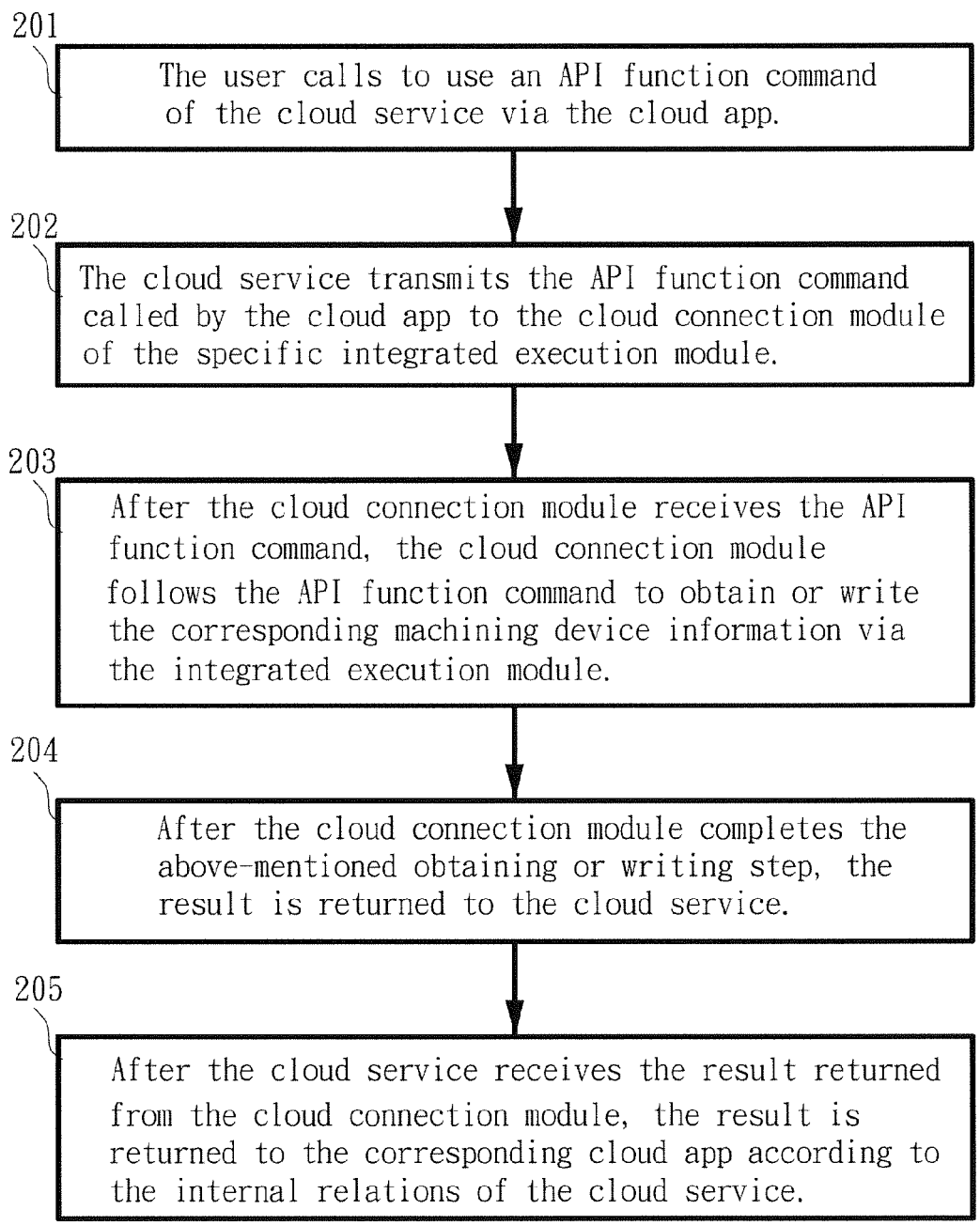
FIG. 5 is a flowchart showing the operation between the cloud app, the cloud connection module of the integrated execution module and the cloud service.

Please refer to FIG. 5. After the cloud app 11 and the cloud connection module 34 of the integrated execution module 33 link to the cloud service 21, as described above, the action operation further involves the following steps:

Step 201: A user uses the cloud app 11 to call an API function command 22 of the cloud service 21.

Step 202: The cloud service 21 transmits the API function command 22 being called to the cloud connection module 34 of a specific integrated execution module.

Step 203: After the cloud connection module 34 receives the API function command 22, the cloud connection module 34 follows the API function command 22 to obtain or write the corresponding machining device information via the integrated execution module 33.

Step 204: After the cloud connection module 34 completes the above-mentioned obtaining or writing step, the result is transmitted back to the cloud service 21.

Step 205: After the cloud service 21 receives the result returned by the cloud connection module 34, it is sent to the corresponding cloud app 11 according to the internal relations of the cloud service 21.

The invention enables a user to use the cloud app 11 on the cloud to link to the machining device 32 of a specific client 31. This allows the user to monitor/control machining devices at different locations in real time through the cloud. With the registration table 23 of the cloud service 21, the user can bundle different cloud apps 11 with the cloud connection modules 34 of the corresponding clients 31, so that different users can simultaneously monitor the machining devices of their own region via the cloud service 21 without any conflict. The cloud apps 11 are kept on the cloud for users to purchase or rent. The developers and cloud service provider can therefore profit from such services.

Moreover, the invention uses the cloud apps 11 to connect to the cloud connection module 34 of the cloud service 21. Therefore, the cloud apps 11 are not limited by network settings. The invention directly uses the API function commands 22 of the cloud service 21 to rapidly obtain the machining device data of various clients 31. It does not need to worry about the problems of passing information back and forth between the clients and the server. Using the advantages of cloud computing, the invention can finish the processing and analysis of a huge amount of data. The integrated execution module 33 of each of the clients 31 further connects to a host database 35. When a huge amount of data is accessed, they are first saved in the host database 35. After the data access, they are further sent to the cloud database 41, thereby overcoming the problem of network speed between the cloud service 21 and the clients 31.

Besides, the integrated execution module 33 of each of the clients 31 integrates app interfaces 331 of different brands of machining devices. Thus, the invention can communicate simultaneously with different brands of machining devices. Operations of machining devices at different clients 31 become simpler and quicker.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A method of linking to and monitoring machining devices through a cloud service for a user to use a cloud app on the Cloud to link to the machining devices of a specific client via the cloud service, with the cloud service having API (Application Programming Interface) function commands for the cloud app to call and use, each of said specific client having a separate integrated execution module for connecting to the machining devices thereof, and the integrated execution module of each of the clients connecting to the cloud service via a separate cloud connection module; the method comprising:

using the cloud app to call and use one of the API function commands of the cloud service by the user;

sending the API function commands of the cloud service to the cloud connection modules connected to the cloud service;

following the API function commands to obtain information of a corresponding machining device via the integrated execution module by the cloud connection module; and returning the obtained machining device information to the cloud app via the cloud connection module and the cloud service;

wherein the cloud service includes a registration table registered with ID information of at least one client and information of users allowed to connect to the integrated execution module of the client; before the integrated execution module of the client connects to the cloud service via the cloud connection module, the cloud service first uses the registration table to verify whether the ID information carried by the cloud connection module is established in the registration table; and the connection is granted if the ID information has been established or disallowed otherwise;

wherein the ID information includes a hardware lock ID and an integrated execution module ID code; the user information includes a cloud app ID and an integrated execution module ID code; after the cloud app or the integrated execution module of the client is verified by the registration table of the cloud service, the integrated execution modules of the same integrated execution module ID code or the cloud apps are connected via the cloud service.

2. The method of linking to and monitoring machining devices through a cloud service of claim 1, wherein the cloud app and the cloud connection module of the integrated execution module of each of the clients connect to the cloud service via the Internet.

3. The method of linking to and monitoring machining devices through a cloud service of claim 1, wherein the cloud has a cloud database connected with the cloud service; and the cloud database provides the cloud app a buffer space for the cloud app to process and analyze a predetermined amount of data within a short time by cloud computing.

4. The method of linking to and monitoring machining devices through a cloud service of claim 3, wherein the integrated execution module of the client further links to a host database; the predetermined amount of data being extracted is first saved in the host database; and the extracted data are then sent to the cloud database after the extraction is over.

5. The method of linking to and monitoring machining devices through a cloud service of claim 1, wherein the integrated execution module of the client integrates multiple sets of app interfaces for connections to the machining devices of particular brands, the integrated execution module generates a command thread for the app interface corresponding to at least one of the machining devices, and each of the command threads is used to extract required information from the corresponding machining device.

6. The method of linking to and monitoring machining devices through a cloud service of claim 5, wherein the integrated execution module further links to a common function runtime module, integrates all of the app interfaces to establish a common app interface in the common function runtime module, the common function runtime module has a plug-in interface for defining function names and data structure thereof for reference of a developer and establishing a naming space to call for use.

* * * * *